Sept. 11, 1951     A. FERRARI     2,567,426
WINE BUNG SCREW VALVE
Filed Dec. 6, 1946
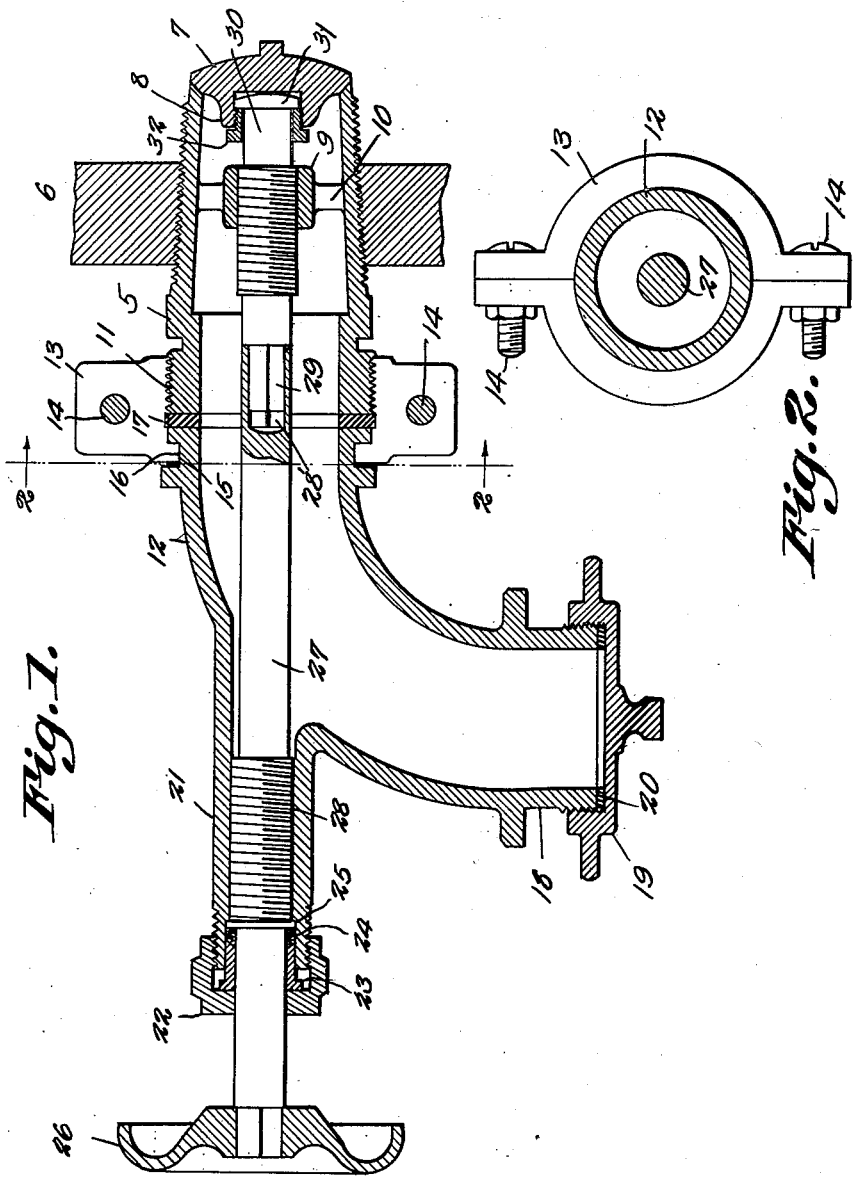
Inventor
*Abele Ferrari*
By *C. A. Nordles.*
Attorneys

UNITED STATES PATENT OFFICE 2,567,426

WINE BUNG SCREW VALVE

Abele Ferrari, Healdsburg, Calif.

Application December 6, 1946, Serial No. 714,548

1 Claim. (Cl. 251—156)

This invention relates to screw valves, and more specifically, to screw valves which are particularly adapted for use on large wine tanks or the like.

It is an important object of the invention to provide a screw valve of the character described which is capable of being disassembled despite its being mounted in an opening in a tank, and serving as a closure of said opening. By way of explanation, it might be pointed out that such disassembling is desirable in order that there may be a minimum projection of the valve from the tank. The contents of tanks of the type described are insurable, and premium rates commonly take into account the obstruction presented by a valve to articles which may be moved past the tank, or which may accidentally fall against the tank, breaking the valve open and causing a loss of liquid from the tank.

It is a further important object of the invention to provide a valve of this type which, though capable of serving its purpose even when disassembled, will, nevertheless, be fully efficient in sealing liquids within the tank, without danger of leaks and the like.

Still another important object is to provide a valve which is capable of easy and simple operation, is at all times positive in fulfilling its function, and which is simply and strongly constructed.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1 is a longitudinal and substantially vertical sectional view through a screw valve constructed in accordance with the invention.

Figure 2 is a view taken on line 2—2 of Figure 1.

Referring to the drawing in detail, the invention embodies a substantially cylindrical hollow body portion 5, externally threaded for mounting in the threaded opening of the stave 6 of a wooden tank. In the embodiment of the invention presented by the drawing, the body portion 5 is shown as tapering in form, and this adapts it particularly for use in wooden tanks. However, it may if desired be fully cylindrical in form, for use in tanks constructed of other materials, in which event it is best provided with a lock nut on its interiorly projecting end.

At its inner end, the body portion 5 is open, providing a seat for a valve 7, the rear surface of which is formed with a cylindrical internally threaded socket 8.

Within the body portion 5 an annular hollow sleeve 9 has a threaded bore coaxially aligned with the bore of the socket 8. A plurality of strips 10 support the sleeve 9 in desired position.

At its rear end, the body portion 5 is cylindrical, and is externally threaded as shown at 11, whereby it may be attached to the spout 12 by means of the internally threaded screw collar 13. As clearly shown in Figure 2, the screw collar 13 is formed in halves that are connectable by bolt and nut means 14, in order that it may be tightened in position, preventing leaks. The adjacent end of the spout 12 has an annular groove 15 cooperating with an annular rib 16 on the screw collar 13, and between the abutting edges of the body portion 5 and spout 12 there is a gasket 17, further sealing the connection against leaks.

To the outlet 18 of the spout 12 is threadedly attached a cap 19, when the bung valve is not being used. A washer 20 in the cap 19 seals the connection between the cap and the outlet 18 at such times, so as to prevent leaks.

Integral with the spout 12 is a cylinder or sleeve 21 that has a bore coaxially aligned with the bore of the sleeve 9 and of the socket 8, the rear or outer end of the cylinder 21 having external threads cooperating with internal threads on a packing gland nut 22, that holds in place a nipple 23, packing 24, and a washer 25.

Extending through the cylinder 21 and rotatable by the handle 26 is the valve stem 27, having an enlarged threaded portion 28 that cooperates with internal threads in the cylinder 21, so that the valve stem may be moved forwardly and rearwardly so as to open and close the valve 7. At its forward end, the valve stem 27 is provided with a bore or socket 28' which has a squared inner surface for receiving the squared rear end 29 of a valve rod 30.

This arrangement, as may be seen by referring to Figure 1, permits detachment of the spout 12 from the body portion 5 without any disassembly of the valve-actuating means other than removal of the squared end 29 of the valve rod 30 from the socket 28' of the valve stem 27. In addition, the squared engagement causes the valve rod 30 to rotate with the valve stem 27 during opening and closing of the valve 7. As readily noted by comparison of the length of the threads 11 with the lengths of the socket 28' and stud 29, the connection of the valve rod and stem for joint rotation is maintained in any position of the spanner nut 13 relative to the body portion 5.

Maintaining the valve rod 30 in desired position is the sleeve 9, through which the valve rod is threaded.

At its forward end, the valve rod 30 is formed with a head 31 that is held tightly against the inner end of the socket 8 by a lock nut 32 threaded into the socket. Thus, rotation of the valve rod in the manner hereinbefore described will cause the valve 7 to be moved forwardly from its seat, opening the valve so that liquids held by the tank may freely pass through the device and be discharged from the outlet 18.

In addition, it is pointed out that in detaching the spout 12 from the body portion 5, there would be no leakage from the device, since the valve rod 30 will in this event be left in the body portion 5, and by reason of its threaded engagement with the sleeve 9, will effectively hold the valve 7 in fully closed position despite the partial disassembly of the device indicated herein.

In connection with detachment of the spout 12 from the body portion 5, the outer circumference of the threaded outlet 18 may be constructed so as to be equal to the outer circumference of the threaded rear end 11 of the body portion 5. This will permit the use of the cap 19 as an attachment to the body portion 5 when the spout 12 is detached.

In the latter event, the projection of the device from the tank, with the spout 12 having been removed, would be very slight, providing a desirable protective feature in the event of heavy articles accidentally striking the device in being moved past the tank, or in the event of a similar accidental occurrence.

What is claimed is:

A valve assembly including a hollow body portion adapted for stationary mounting in a tank wall opening, an internally threaded sleeve mounted within the body portion and spaced from the wall thereof to provide a clearance for liquid passing through the body portion and around the sleeve, a solid valve rod threaded in the sleeve and having one end formed noncircularly, a valve disc on the other end of the rod and adapted to seat against one end of the body portion to close the same, a spout, a screw collar swivelled on the spout and threaded on the other end of the body portion, said spout having internal threads identical to the threads of the sleeve, and a valve stem threadedly engaged in the spout and having a noncircular socket at one end slidably and non-rotatably receiving the noncircular end of the valve rod when the screw collar is threaded upon the body portion to connect the body portion and spout, the socket and noncircular valve rod end respectively being of lengths to cause maintenance of the connection for joint rotation therebetween in any position of threaded engagement of the screw collar with the spout, the like threads on the coupled valve rod and stem being disposed at opposite sides of the slidable and non-rotatable connection therebetween and constituting means holding the valve rod and stem against relative longitudinal movement in either direction during threaded advancement and retraction of said valve rod and stem.

ABELE FERRARI.

REFERENCES CITED

The following references are of record in the file of this patent:

UNITED STATES PATENTS

| Number | Name | Date |
| --- | --- | --- |
| 142,090 | Earle | Aug. 26, 1873 |
| 307,294 | Granger | Oct. 28, 1884 |
| 334,314 | Walsh | Jan. 12, 1886 |
| 625,598 | Pickett | May 23, 1899 |
| 645,696 | Topp | Mar. 20, 1900 |
| 659,288 | Church | Oct. 9, 1900 |
| 900,811 | Wilcox | Oct. 13, 1908 |
| 1,014,533 | Tillotson | Jan. 9, 1912 |
| 1,412,042 | Coar | Apr. 11, 1922 |
| 1,471,991 | White | Oct. 23, 1923 |
| 1,534,138 | Ostrander | Apr. 21, 1925 |
| 2,100,457 | Trott | Nov. 30, 1937 |